United States Patent

[11] 3,576,330

[72] Inventor George E. Gard
 Lancaster, Pa.
[21] Appl. No. 5,647
[22] Filed Jan. 26, 1970
[45] Patented Apr. 27, 1971
[73] Assignee Armstrong Cork Company
 Lancaster, Pa.
 Continuation-in-part of application Ser. No. 576,017, Aug. 30, 1966, now Patent No. 3,492,011.

[54] RUBBER METAL LAMINATED GASKET CONSTRUCTION
 5 Claims, 5 Drawing Figs.
[52] U.S. Cl. ................................................ 277/235, 161/211
[51] Int. Cl. ....................................................F16k 41/00, F02f 11/00, B65d 53/00
[50] Field of Search........................................... 277/235, 233, 234, 237; 161/211, (Cork Dig.), (Gasket Dig.)

[56] References Cited
UNITED STATES PATENTS

| | | | |
|---|---|---|---|
| 1,635,482 | 7/1927 | Joyce | 277/228 |
| 1,695,822 | 12/1928 | Restein | 277/233 |
| 3,336,035 | 8/1967 | Price | 277/235X |
| 3,492,011 | 1/1970 | Gard | 277/235 |

Primary Examiner—Samuel Rothberg
Attorney—Clifford B. Price

ABSTRACT: A metal foil is laminated between two outer pieces of cork gasket material. The metal foil is provided with a rubber coating on at least one side of the foil. The metal foil and its rubber coating extend perpendicularly from the two surfaces meant to be sealed by the gasket.

PATENTED APR 27 1971  3,576,330
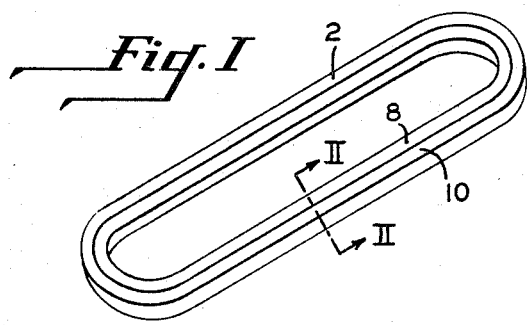
Fig. I
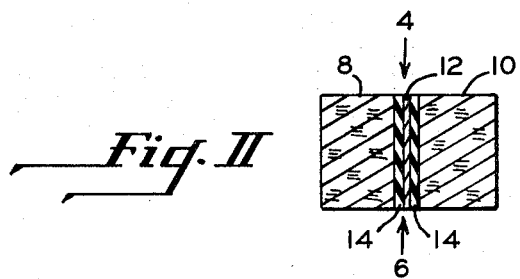
Fig. II
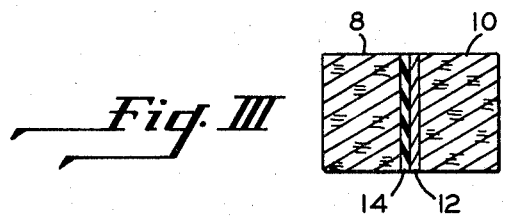
Fig. III
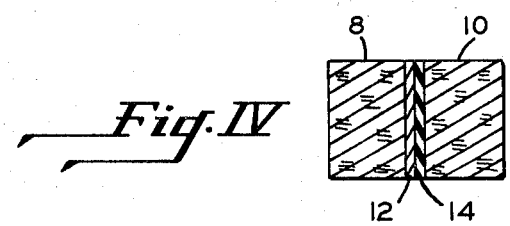
Fig. IV
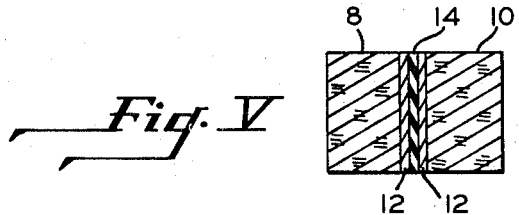
Fig. V
INVENTOR
GEORGE E. GARD
BY
ATTORNEY

RUBBER METAL LAMINATED GASKET CONSTRUCTION

CROSS-REFERENCE TO RELATED APPLICATION

This application is a continuation-in-part of application Ser. No. 576,017, filed Aug. 30, 1966, titled "Laminated Gasket Construction," and now issued to the applicant, George E. Gard, as U.S. Pat. No. 3,492,011.

BACKGROUND OF THE INVENTION

1. Field of the Invention

The invention related generally to resilient gaskets and, more particularly, to a rubber-metal laminated gasket structure.

2. Description of the Prior Art

Resilient gaskets were conventionally made from a cork composition comprising granulated cork of suitable particle size mixed with a binder and molded under heat and pressure. As indicated in the above-mentioned application, gaskets are produced generally by taking thin sheets of cork and laminating them to the desired gasket thickness or forming a tubelike structure in the general configuration of a gasket and then cutting the tube into a plurality of individual gaskets.

The above application is specifically directed to the use of a metal foil positioned midway between the two outer resilient portions of the gasket, said portions being formed from a cork composition. The foil is useful in providing strength in critical areas, such as those surrounding bolt holes, and for assisting in marginal sealing at the interface between the gasket and the flange of the surface to be sealed.

The invention herein provides for a better seal at the interface through the use of a few mil layer of rubber or other material having a plastic flow adjacent the foil. Such rubber, having a plastic flow under compression and being laterally contained by the cork composition, completes a more perfect seal in the interface region.

SUMMARY OF THE INVENTION

The invention herein is directed to the placing of a thin coating of a flowable material on the included foil of a gasket structure of the above-mentioned copending application. The gasket herein is manufactured by the same technique as that disclosed in the copending application. The rubber coating may be placed on both sides of a single piece of foil, on only one side of a single piece of foil or between two separate pieces of foil. Rubber has a plastic flow under compression and the outer portions of cork composition gasket material prevent the rubber from expanding outwardly away from the foil surface. The plastic flow will consequently be along the foil surface and tend to improve the seal in the region where the end of the foil and rubber coating contacts the surface to be sealed.

BRIEF DESCRIPTION OF THE DRAWINGS

FIG. I is an isometric view of a gasket structure;

FIG. II is a cross-sectional view of FIG. I along lines II-II showing one embodiment of the invention herein;

FIG. III is a cross-sectional view similar to FIG. II showing yet another embodiment of the invention herein;

FIG. IV is a cross-sectional view similar to FIG. II showing yet another embodiment of the invention; and FIG. V is a cross-sectional view similar to FIG. II showing still another embodiment of the invention herein.

DESCRIPTION OF THE PREFERRED EMBODIMENTS

The gasket structures shown in the figures of the drawings herein are made by the method set forth in copending application Ser. No. 576,017. The difference between that application and this application rests in the cross-sectional construction of a gasket made according to the teaching of the above-mentioned application. FIG. I shows a conventional gasket 2. FIGS. II through V show different alternative embodiments of the cross-sectional structure of the gasket 2.

Referring first to FIG. II, the upper surface 4 is one surface which is placed against a surface to be sealed and the lower surface 6 is the other surface of the gasket which is placed adjacent the opposite surface of the structure to be sealed. Consequently, the gasket is clamped between opposing clamping surfaces with the opposing clamping surfaces acting upon sealing surfaces 4 and 6 of the gasket construction. The clamping surfaces act upon the embodiments of FIGS. III through V in the same manner.

The outer portions 8 and 10 of the gasket construction are made of a cork composition or similar resilient material. The foil structure 12 is made of a thin metallic foil. However, as indicated in the above-mentioned copending application, synthetic films and other materials could be used and the foil will range in thickness from 0.0005 inch to 0.010 inch. A particularly serviceable product has been molded using a 1 mil aluminum foil. Normally, epoxy adhesives have been found satisfactory for joining the different sheets together. In the embodiment of FIG. II, a rubber coating 14 of 5 mil thickness has been placed on each side of the foil 12. Since the gasket is formed and cured by a subsequent heating operation, uncured rubber is utilized. However, other materials could be utilized as long as they have a plastic flow characteristic when the gasket structure is being used in the performance of its sealing function.

Referring to FIG. III, there is shown a modification of the FIG. II structure wherein the foil 12 has the rubber coating 14 positioned on only one side. The coating is on the side of the foil adjacent the inner portion 8 of the cork composition. This inner portion 8 is that portion of the gasket which faces inwardly of the gasket structure. FIG. IV is a variation of FIG. III, wherein the rubber coating 14 is only on one side of the foil 12 and is positioned adjacent the outer portion 10 of the cork gasket. The outer portion 10 of the gasket being that portion of the cork composition which is on the outward perimeter of the gasket structure. Finally, looking at FIG. V, there is shown a further modification wherein the portions 8 and 10 are in their regular position, and then two foil sections 12 are used with the rubber coating 14 being positioned between the two foil sections.

It has been found that a rubber coating of 2 to 20 mils in thickness has worked satisfactorily. A coating of substantially 5 mils in thickness with a 1 mil foil has proven to be especially useful. As it has been indicated above, materials other than rubber may be used as long as there is the plastic flow nature for the material. This plastic flow must exist when the gasket is placed under compression. The inner and outer portions of the cork composition prevent the plastic flow from moving away from the foil and permit the plastic flow to be along the foil so that the rubber tends to develop a good seal at the clamping surfaces 4 and 6 in the region of the foil where the foil is in contact with the surfaces to be sealed.

The particular structures disclosed herein have demonstrated an equivalency to a completely rubber-coated gasket having the included foil. Naturally, this particular structure reduces substantially the need for four surfaces coated with rubber. Also, the rubber coating may be provided as an integral coating on the foil or may be used as a separate laminate in the gasket structure as it is assembled according to the technique of the copending application. Consequently, the advantages of a completely rubber-coated gasket can be secured by the use of a simpler manufacturing technique and yield a substantial reduction in rubber material. Dimensional stability with this structure has proven to be particularly advantageous.

I claim:

1. A laminated circumferentially extending gasket for sealing the space between opposed substantially parallel clamping surfaces to prevent fluid passage therethrough, comprising a compressible body having inner and outer resilient portions, said resilient portions each being formed of a cork composition and having a substantially rectangular cross section, a reinforcing and sealing element of aluminum foil adhesively bonded between said resilient portions, said foil having a thickness in the range of approximately 1 to 15 mils, said resilient portions and the edge of said foil cooperating to form opposed substantially parallel sealing surfaces adapted for engagement by the opposed clamping surfaces, said foil being coated on at least one side with a means which has a plastic flow characteristic under compression, said foil element being continuous throughout the circumference of said gasket and being substantially perpendicular to said parallel sealing surfaces, and said coating means extending along the foil and being positioned between at least one side of the foil and at least one resilient portion so that the means will have a directional plastic flow when the gasket is clamped between opposed clamping surfaces which cause a compression of said resilient portions and a deformation of the foil in a folded-accordion fashion, said foil element adapting to the compressed condition of said resilient portions with the foil element edges remaining at said sealing surfaces in continuous circumferential engagement with said clamping surfaces and said coating means acting upon the clamping surfaces in the vicinity of the foil to provide a sealing effect at that point.

2. The gasket of claim 1 wherein the coating means adjacent the foil is a coating on both sides of the foil.

3. The gasket of claim 1 wherein the coating means adjacent the foil is positioned between the foil and the inner resilient portion.

4. The gasket of claim 1 wherein the coating means adjacent the foil is positioned adjacent the foil and the outer resilient portion.

5. The gasket of claim 1 wherein the coating means is positioned between two foils.